United States Patent [19]
Cameron

[11] Patent Number: 5,277,247
[45] Date of Patent: Jan. 11, 1994

[54] HEAT EXCHANGER HAVING IMPROVED TUBE LAYOUT

[76] Inventor: Gordon M. Cameron, 4, Wellesbourne Cres., Willowdale, Ontario, Canada, M2H 1Y7

[21] Appl. No.: 905,452

[22] Filed: Jun. 29, 1992

[51] Int. Cl.$^5$ .............................................. F28D 7/10
[52] U.S. Cl. .................... 165/159; 165/910
[58] Field of Search ............................ 165/159, 910

[56] References Cited

U.S. PATENT DOCUMENTS

| | | | |
|---|---|---|---|
| 4,357,991 | 11/1982 | Cameron | 165/159 |
| 4,547,353 | 10/1985 | Cameron | 423/522 |
| 4,654,205 | 3/1987 | Cameron | 423/522 |
| 4,732,585 | 3/1988 | Lerner | 165/159 |
| 4,796,695 | 1/1989 | Cannon | 165/159 |
| 5,004,042 | 4/1991 | McMorries, IV et al. | 165/159 |
| 5,044,431 | 9/1991 | Cameron | 165/158 |

FOREIGN PATENT DOCUMENTS

| | | | |
|---|---|---|---|
| 24353 | 2/1979 | Japan | 165/159 |
| 88630 | 8/1920 | Switzerland | 165/159 |

OTHER PUBLICATIONS

"Waste Heat Recovery From Sulphuric Acid Plants" Sulphur Mar./Apr., 1980, Dahya Bhaga,—The British Sulphur Corporation Ltd.

*Primary Examiner*—John Rivell
*Assistant Examiner*—L. R. Leo
*Attorney, Agent, or Firm*—Smith, Lyons, Torrance, Stevenson & Mayer

[57] ABSTRACT

A heat exchanger for exchanging heat between fluids comprising a shell and five tube bundles laid out as to collectively form a series of concentric pentagons, wherein each adjacent pair of tube bundles define an angle of 108° and extend longitudinally within said shell and define a central space between them, said central space also extending longitudinally in said shell and being parallel to said tubes; each tube bundle consisting of a plurality of longitudinally extending parallel tubes in end view laid out in a set of parallel lines wherein each tube on a first parallel line with the two nearest tubes each on a second line adjacent to said first line forms an isosceles triangle having one angle of 72° and two angles each of 54°. This allows simple heat exchanger tube layout which is easy to fabricate and provide a compact tube bundle. The tube layout utilizes core tube entry of fluids and can accommodate internal core tubes or bypasses to cope with differential expansion.

5 Claims, 4 Drawing Sheets

HEAT EXCHANGER HAVING IMPROVED TUBE LAYOUT

FIELD OF THE INVENTION

This invention relates to heat exchangers having an improved tube layout.

BACKGROUND OF THE INVENTION

Present equipment for heat transfer between fluids in industry is based on tubular heat exchange equipment in which one fluid passes through a tube and a second fluid passes around the outside of the tube with heat transfer through the tube wall. Most heat transfer requirements are sufficiently large that many tubes are needed and which, typically, operate in parallel. The tubes are contained between tube sheets in a heat exchanger shell with the fluid outside the tubes being directed in such a way that significant turbulence is generated to facilitate heat transfer to the tube wall.

Use of heat exchangers for liquid to liquid heat transfer is illustrated in the manufacture of sulphuric acid as described in U.S. Pat. No. 4,495,161—Gordon M. Cameron et al. issued Jan. 22, 1985, U.S. Pat. No. 4,547,353—Gordon M. Cameron, issued Oct. 15, 1985 and U.S. Pat. No. 4,654,205—Gordon M. Cameron, issued Mar. 31, 1987, wherein hot, concentrated sulphuric acid is cooled by water or a heat transfer fluid, optionally, subsequent to water dilution thereof.

Use of heat exchangers for gas-to-gas heat transfer, particularly, for waste heat recovery is described in "SULPHUR" entitled "Waste Heat Recovery from Sulphuric Acid Plants", Dahya Bhaga, March/April, 1980 published by The British Sulphur Corporation Limited, London, England.

Classically, the key to good exchanger design lies in the most effective use of the available pressure difference between inlet and outlet ends of the shell space to generate heat transfer enhancing turbulence, compatible with appropriate shell construction to give adequate support to the tubes between the tube sheets and to prevent tube vibration and subsequent mechanical damage to the tubes. Baffles are a general means of directing fluid flow and can be arranged to give ordinary cross-flow across the tubes, partial cross-flow in a double segmental design, and an inflow-outflow arrangement referred to as "disc-and-donut" baffling.

Typical heat exchangers use tubes arranged in a variety of cross-sectional layouts, either in in-line or staggered layouts, diagrammatically represented as equilateral triangles, isosceles triangles, square and rotated square pitches and, more recently, a radially symmetrically pitch in which tubes are arrayed in concentric rings with an open core and an open outer annulus. An array of tube layouts in heat exchangers can be seen in Perry, J. H., "Chemical Engineers Handbook", U.S. Pat. No. 4,357,991—Gordon M. Cameron, issued Nov. 9, 1982 and U.S. Pat. No. 5,044,431—Gordon M. Cameron, issued Sep. 3, 1991.

The heat transfer area required in a heat exchanger is normally proportional to the fluid flow and the number of tubes contained in a shell will rise proportionally to the cross-sectional area of the shell. Baffles are normally used to force the shell fluid to flow from one side of the shell to the other side. The open space between the tubes for flow across the tubes is then proportional to the diameter of the shell which is proportional to the square root of the cross-sectional area. The velocity with which the shell side fluid flows across the tubes is also limited by pressure loss and tube vibration conditions. As a result, with larger units, the baffles which direct the cross-flow (and protect the tubes against damage from vibration) must be moved farther and farther apart as the exchanger gets larger to compensate for the difference between the linear growth of the flow and the shell growth as the square root of the area and flow. The other alternative is to move the tubes farther apart so that there is more room for fluid flow. This alternative leads directly to much larger equipment which is more costly and may also be much harder to obtain.

To reduce potential problems caused by fluid flow, several baffle arrangements have been utilized. These include double segmental baffles, where the fluid only flows across half of the tube bundles, steadying baffles located between flow-directing baffles, and more recently re-introduction of the disc-and-donut baffles in which the area of gas flow across the bundle is significantly larger than for simple cross-flow. Problems due to fluid flow are especially significant in large atmospheric pressure gas-to-gas heat transfer equipment. Use of the correct baffle spacing to keep velocity flow at a reasonable level can require baffle spacing as low as 10 cm in a small unit and up to 3 m in a large heat exchanger.

While many units have a first fluid colder at all times than the second fluid, in many other exchangers there is a temperature cross such that the first fluid leaves the exchanger at a temperature above that of the exiting second fluid. For this arrangement to be practical, the fluids must travel in essentially opposite directions. Since a flow pass across the tubes is not counter-current, the greater the number of cross-flow passes through a tube bundle the more closely the flow will approach the counter current case and the more effective will be the heat transfer.

Good shell flow arrangements in large units need to have adequate baffles to generate heat transfer inducing turbulence, good tube support and provide reasonable and sufficient counter-current flow. Further, such designs must also result in reasonable economic costs commensurate with size.

The tube bundle within the shell space may also be spread uniformly across the shell in a design referred to as a "filled shell". In an alternative layout, the tubing may be confined to only part of the exchanger shell to provide open spaces called "windows". These windows are frequently used to transfer the shell-side fluid from one cross-flow pass to the next cross-flow pass and provide designs referred to as "No Tube In Window" (NTIW) designs.

Classically, tube bundles are laid out in straight lines along the length of the shell wherein fluid flows across or through the straight line tube bundle. With fluid flow in a radial direction the shell circumference increases as the radius of the shell increases. One successful method by which the tube bundle is laid out is described in U.S. Pat. No. 4,357,991—Cameron, wherein the tube bundle is laid out in an array of a plurality of circles such that the tubes are staggered to provide maximum shell fluid velocity set by diagonal gaps between adjacent rings, with the radial spacing between the rings decreasing with increasing ring radius. A severe limitation as to the usefulness of this tube array is that the number of rings of tubes is limited in that there is a minium radial separation below which the tubes on the same radial line are too close for proper fabrication. In practice, it has normally been found necessary to have several families of different tubing densities. With different families, tubes nearer the core normally have large ligaments and fewer tubes per ring while the outer tube families have more tubes per ring with small ligaments. Such an array results in the tube packing being significantly less than theoretical optimal. This is a significant draw back in that the density of tube packing is important in a large heat exchanger as it sets the size of the heat exchanger.

An alternative and improved version of radial tube layout is described in U.S. Pat. No. 5,044,431—Cameron wherein it is seen that the gap between the innermost and outermost rings of a family having constant diagonal ligaments is proportional to the radius of curvature of the innermost ring. U.S. Pat. No. 5,044,431, shows and describes a polygonal, including a generally pentagonal, arrangement. However, each tube is set out on arc and each of the tube bundles has a meta center displaced from the center of symmetry of the tube bundles and from the meta centers of the other tube bundles.

Thus, the single family concept can be extended to larger tube counts. This is achieved by splitting the circle into equal sectors each having a pseudo-center located more remote from the tubes than the axis of the shell. A drawback of this design is that open corners are created which are difficult to fill with tubes and thus provide a possible leak path. This disadvantage is reduced in larger heat exchangers.

Tube layout in a radially, symmetrical exchanger having variable radial gaps is also significantly more complicated than a tube layout having straight lines. The multiple family design is again further complicated. There is, therefore, still a need for a tubing layout pattern which provides a compact heat exchanger tubing bundle to provide good heat transfer and yet is simple to fabricate.

SUMMARY OF THE INVENTION

It is therefore an object of this invention to provide an improved tube layout within a heat exchanger where flow is essentially radial across the tube bundle and windows in the baffles are free of tubes.

In a further object the invention provides simple heat exchanger tube layout which is easy to layout and fabricate and provides a compact tube bundle.

It is a still further object of the invention to provide a tube layout which utilizes core tube entry of fluids and can also accommodate internal coretubes or by-passes and to cope with differential expansion.

Accordingly, the invention provides in one aspect a heat exchanger for exchanging heat between fluids comprising a shell and five tube bundles laid out as to collectively form a series of concentric pentagons, wherein each adjacent pair of tube bundles define an angle of 108°, and extending longitudinally within said shell and define a central space between them, said central space also extending longitudinally in said shell and being parallel to said tubes; each tube bundle consisting of a plurality of longitudinally extending parallel tubes, in end view laid out in a set of parallel lines wherein each tube with the two nearest tubes each on the same line adjacent to the line having said each tube forms an isosceles triangle having one angle of 72° and two angles each of 54°.

Preferably, but not exclusively, the concentric pentagons are regular-shaped, rather than of an irregular-shaped layout, for ease of construction.

More preferably, the ratio of the diagonal ligament distance to the outer tube diameter is selected from the range 1:12 to 1:3.

In a yet more preferred aspect the heat exchanger further comprises an additional plurality of parallel tubes extending longitudinally within the shell between the tube bundles and the shell wall.

Thus, the invention provides a pentagonal array of tubes having tubes at the corners of the array and providing defined limiting flow paths.

The heat exchangers as hereinabove defined are of particular value in plants for the manufacture of sulphuric acid.

Accordingly, in a further aspect the invention provides an improved plant for the manufacture of sulphuric acid by the oxidation of sulphur dioxide to sulphur trioxide in a catalytic converter and subsequent absorption of said sulphur trioxide in sulphuric acid, said plant comprising an absorption tower, a heat exchanger and said catalytic converter, wherein the improvement comprises a heat exchanger as hereinabove defined.

The heat exchanger according to the invention may be used for gas to gas heat transfer and for liquid to liquid heat transfer.

A typical location of a heat exchanger for gas to gas heat transfer in a sulphuric acid manufacturing plant is that between and connecting two different beds of the catalytic converter for the exothermic conversion of the sulphur dioxide to sulphur trioxide gas. Hot gases emanating typically at a temperature of 630° C. from a first bed is cooled in the heat exchanger by and preheats a sulphur dioxide containing gas for subsequent conversion.

A typical duty of a heat exchanger for liquid to liquid heat transfer in a sulphuric acid manufacturing plant is that for cooling hot sulphuric acid exiting from an intermediate or final absorption tower wherein a sulphur trioxide gaseous mixture is exothermically absorbed in 98% w/w sulphuric acid which is, subsequently, optionally, exothermically diluted with water. Typically, sulphuric acid will be cooled from 110° C. to 75° C. using cooling water.

Accordingly, in yet a further aspect, the invention provides a process for the manufacture of sulphuric acid from sulphur dioxide said process comprising oxidising said sulphur dioxide to sulphur trioxide and further comprising producing a first fluid, feeding said first fluid to a heat exchanger, feeding a second fluid to said heat exchanger for heat transfer therein with said first fluid, collecting said first fluid as first exit gas, collecting said second fluid as second exit gas, wherein said first fluid is passed through tubes of a heat exchanger for exchanging heat between said first and said second fluids, said heat exchanger comprising a shell and five tube bundles laid out as to collectively form a series of concentric pentagons, wherein each adjacent pair of tube bundles define an angle of 108°, and extending longitudinally within said shell and define a central space between them, said central space also extending longitudinally in said shell and being parallel to said tubes; each tube bundle consisting of a plurality of longitudinally extending parallel tubes, in end view laid out in a set of parallel lines wherein each tube with the two adjacent tubes on the same line adjacent to the line having said each tube forms an isosceles triangle having one angle of 72° and two angles each of 54°; and wherein said second fluid is passed through said shell between said tubes.

In one embodiment said first fluid is the gaseous mixture comprising sulphur trioxide obtained by the exothermic catalytic oxidation of said sulphur dioxide. Alternatively, the gaseous mixtures comprising sulphur trioxide could constitute said second fluid.

In a further preferred embodiment said second fluid is a hot concentrated sulphuric acid obtained by the exothermic absorption of water in a sulphuric acid drying tower.

In a further process, said second fluid is a hot concentrated sulphuric acid obtained by the exothermic absorption of sulphur trioxide into sulphuric acid in a sulphuric acid absorption tower selected from an intermediate absorption tower and a final absorption tower.

In yet a further aspect, the invention provides a process for the manufacture of sulphuric acid from sulphur dioxide comprising feeding air to a sulphuric acid drying tower to produce dry air and a first hot concentrated sulphuric acid; oxidising said sulphur dioxide with said dry air to produce a hot gaseous mixture comprising sulphur trioxide, sulphur dioxide and air; absorbing said sulphur trioxide in a sulphuric acid absorption tower selected from an intermediate absorption tower and a final absorption tower to produce a second hot concentrated sulphuric acid; passing a coolant fluid through the tubes of a five tube bundle shell and tube heat exchanger wherein said heat exchanger comprises said shell and said five tube bundles laid out as to collectively form a series of concentric pentagons, wherein each adjacent pair of tube bundles define an angle of 108°, and extending longitudinally within said shell and define a central space between them, said central space also extending longitudinally in said shell and being parallel to said tubes; each tube bundle consisting of a plurality of longitudinally extending parallel tubes, in end view, laid out in a set of parallel lines wherein each tube with the two adjacent tubes on the same line adjacent to the line having said each tube forms an isosceles triangle having one angle of 72° and two angles each of 54°; and wherein said second fluid is passed through said shell between said tube bundles; passing a heating fluid selected from said hot gaseous mixture and a hot sulphuric acid selected from said first hot concentrated sulphuric acid and said second hot concentrated sulphuric acid through said shell between said tube bundles within said heat exchanger for heat transfer with said coolant fluid to produce a cooled fluid selected from a cooled sulphuric acid and a cooled gaseous mixture, and heated coolant fluid; collecting said cooled fluid; and collecting said heated coolant fluid.

Further objects and advantages of the invention will appear from the following description, when taken together with the accompanying drawings.

BRIEF DESCRIPTION OF THE DRAWINGS

In order that the invention may be better understood a preferred embodiment will now be described by way of example only with reference to the accompanying drawings wherein.

DETAILED DESCRIPTION OF A PREFERRED EMBODIMENT

Figure 1:
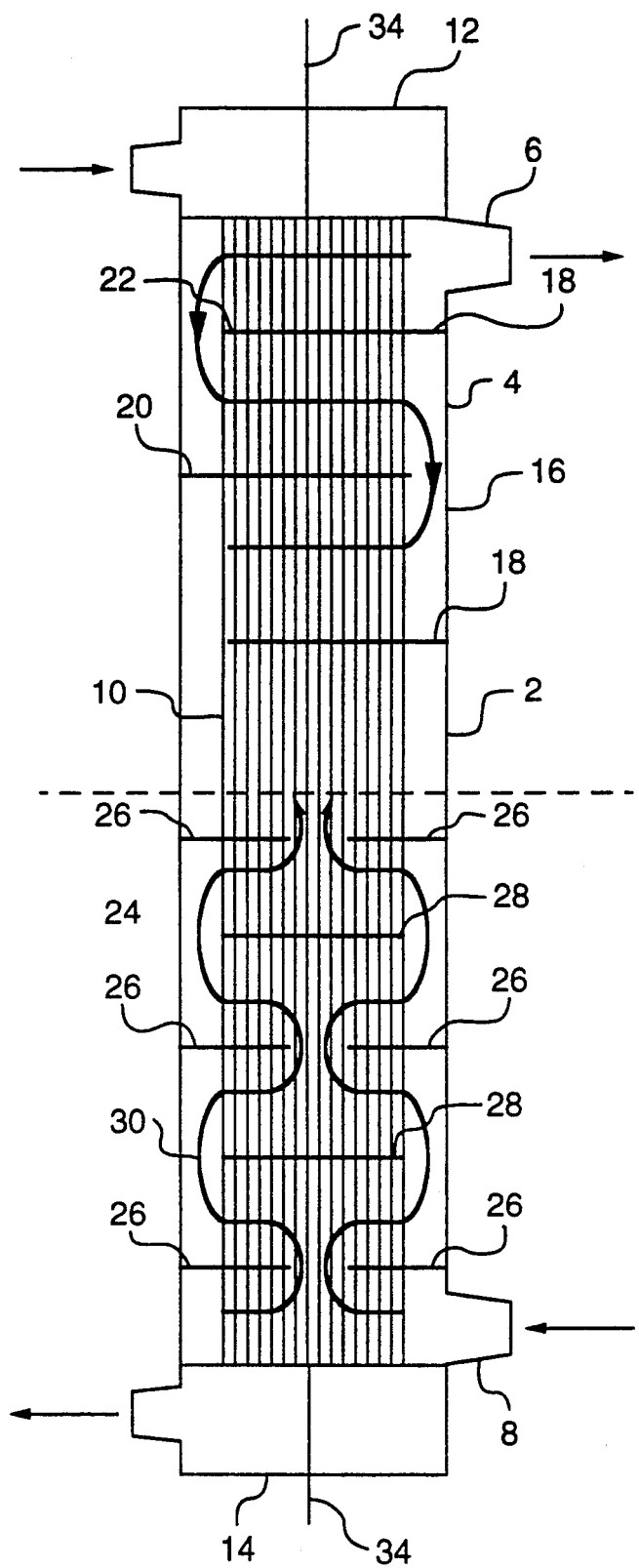
FIG. 1 is a diagrammatic view of a heat exchanger according to prior art showing both single segmental and double segmental baffles.

Reference is first made to FIG. 1, where there is diagrammatically shown a cylindrical heat exchanger 2 for use in various locations in a sulphuric acid manufacturing plant. The heat exchanger 2 has a cylindrical shell 4 having inlet openings 6, 8 for fluid which is to be heated or cooled. Such fluid, since it is contained by the shell, is referred to as "shell-side" fluid.

The heat exchanger 2 also has a number of parallel tubes 10 which extend longitudinally in the shell 4 between vestibules 12 and 14 and parallel to the axis of symmetry 34. Heat exchange fluid for tubes 10 (used for heating or cooling the shell-side fluid) enters at one of the vestibules and leaves at the other.

The upper portion 16 of shell 4 is shown as having single segmental baffles 18, 20, each of which extends laterally partway across the tubes 10 as indicated by 22. The bottom half 24 of heat exchanger 2 is shown as having double segmental baffles, 26, 28, having a segmental configuration, which forces the fluid to travel across tubes 10 as indicated by arrows 30. In practice, a heat exchanger will, normally, have only one kind of baffle arrangement, either single or double segmental.

Figure 2:
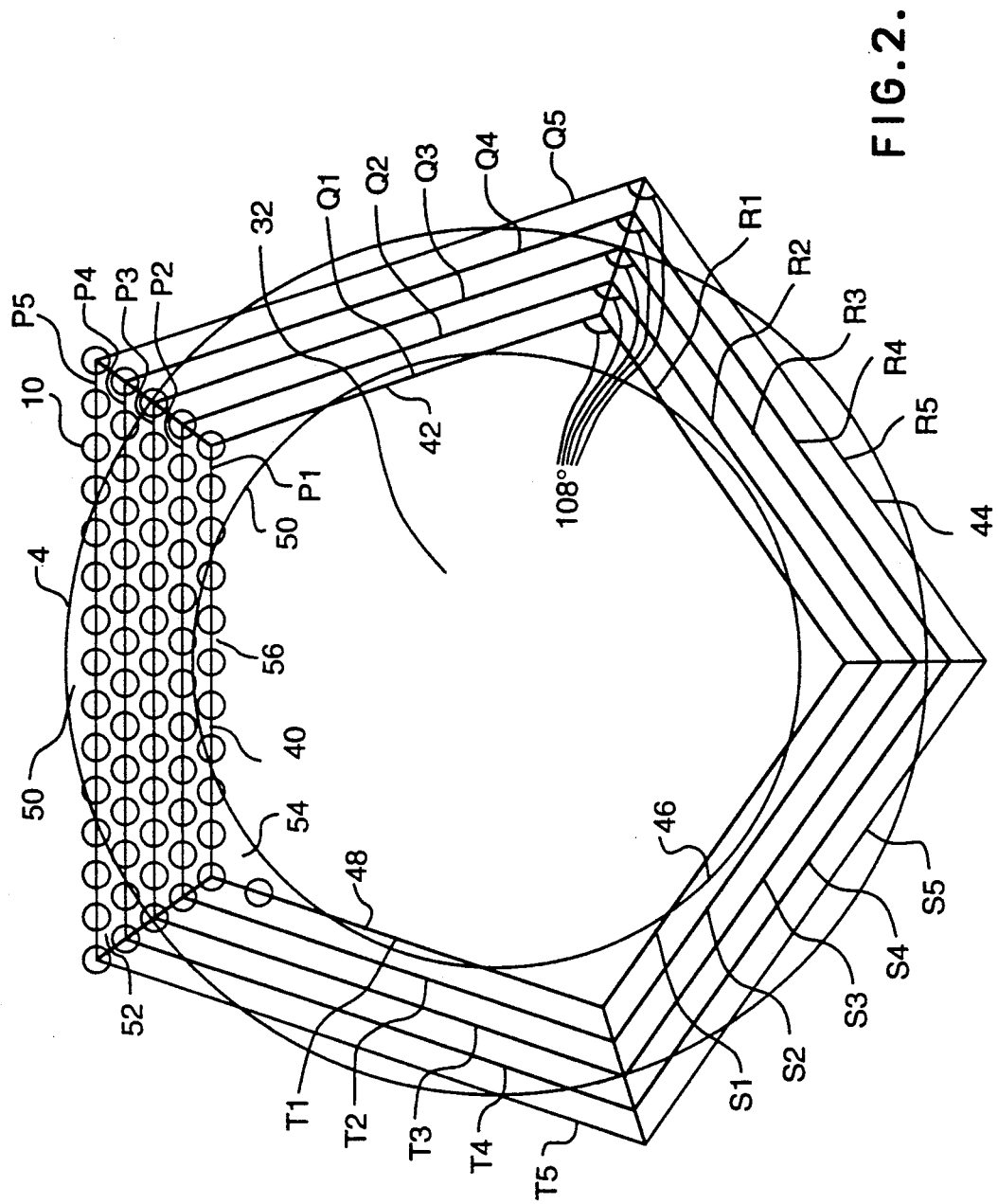
FIG. 2 is a diagrammatic cross-sectional view showing in part a heat exchanger tubing layout according to the invention.

With reference now to FIG. 2 which shows, in end view, the tubing layout in more detail as a regular-shaped pentagonal tube layout according to the invention comprising five tubing bundles, shown as 40, 42, 44, 46 and 48. These tubing bundles are all the same and accordingly, only part of tubing bundles 40 and 48 will be subsequently described in detail, (FIG. 3).

The five tube bundles 40, 42, 44, 46 and 48 within shell 4 of heat exchanger 2 are laid out as to collectively form a series of concentric regularly-shaped pentagons wherein each tube bundle consists of a plurality of longitudinally extending parallel tubes 10 laid out in a set of parallel lines constituting the concentric pentagons disposed at various distances from the longitudinal axis of symmetry 34 when the five tube bundles are taken collectively. The diagrammatic parallel lines describing the tube layout in cross-section are shown as P1, P2, P3, P4 and P5 for tube bundle 40; Q1, Q2, Q3, Q4 and Q5 for tube bundle 42; R1, R2, R3, R4 and R5 for tube bundle 44; S1, S2, S3, S4 and S5 for tube bundle 46; and T1, T2, T3, T4 and T5 for tube bundle 48. Thus, each adjacent pair of tube bundles define angles of 108° and wherein each pentagon P1Q1R1S1T1, P2Q2R2S2T2, P3Q3R3S3T3, P4Q4R4S4T4 and P5Q5R5S5T5 define increasingly larger central spaces 32 between them.

Diagrammatically shown in FIG. 2 are outer circle 4 constituting a circle of the same area 4 and inner circle 50 denoting the central core of heat exchanger 2. Circle 50 represents a circle containing the same cross-sectional area as the inner pentagon defined by the area P1Q1R1S1T1. Similarly, Circle 4 represents the circle containing the area P5Q5R5S5T5. Since such heat exchangers normally will be contained in a round shell the outer circle 4 shows that the flat sides spaces 58 are regions where tubes can be inserted whereas tubes at corner spaces 52 project significantly outward towards the shell wall and may compromise or block circumferential flow around the bundle. With reference to these circles and the five concentric pentagons, it can be seen that tubes present at the outer corners 52 of the outer pentagons can be relocated to the inner corners 54 and from the inner pentagon central regions 56 of the parallel lines to the outer central regions of the parallel lines 58 to produce a rounder arrangement within the shell while still preserving the basic pentagonal layout and its attendant advantages. Thus, the space between the tubes of the pentagonal tube bundles and the wall of the shell may contain an additional plurality of parallel tubes extending longitudinally within the shell.

Figure 3:
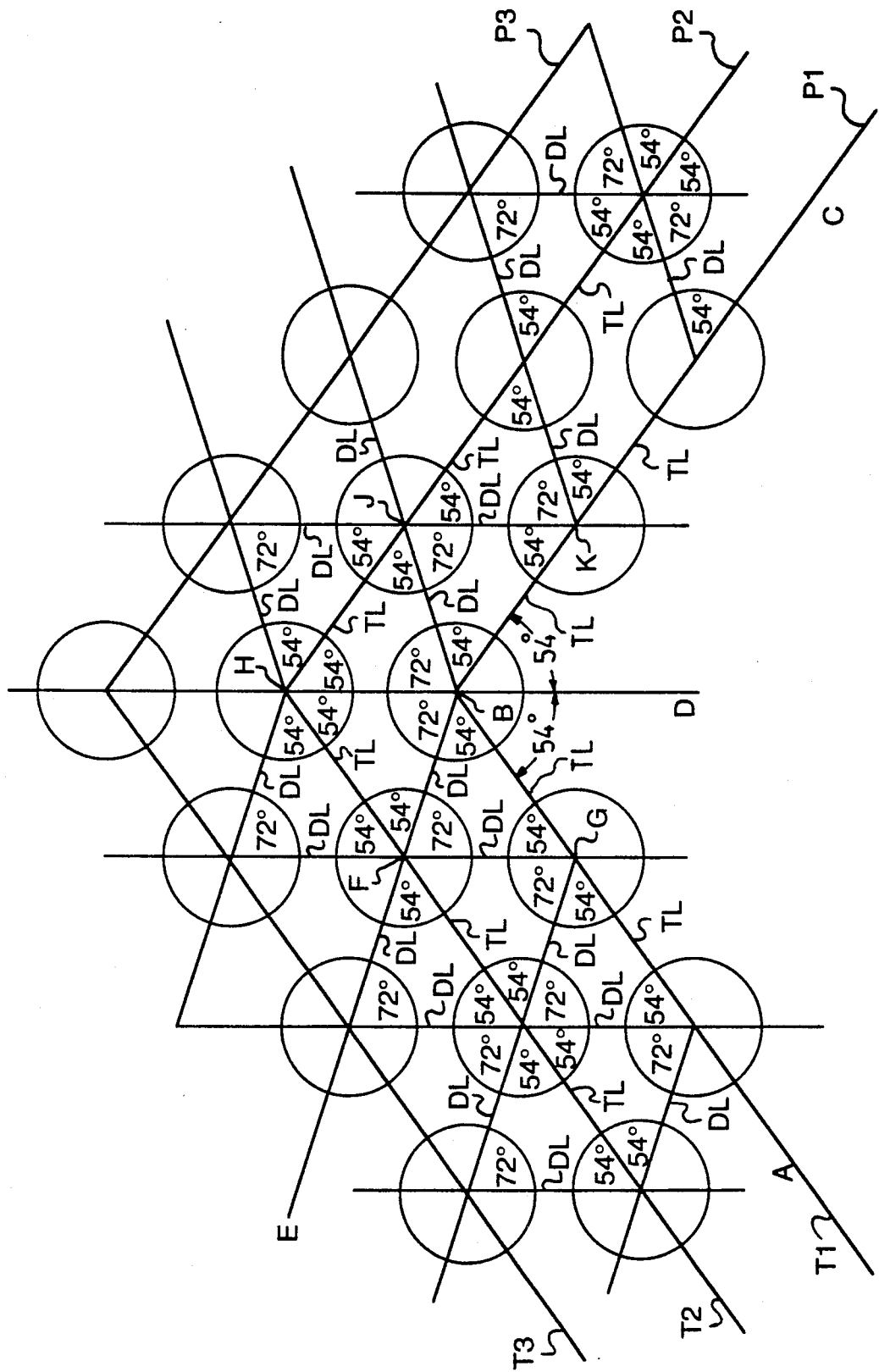
FIG. 3 shows an enlarged diagrammatic cross-sectional view showing a part arrangement of the tube layout of FIG. 2.

As explained more fully with reference to FIG. 3, each tube is so located on its parallel line that it forms with the two nearest or closest tubes each on the same adjacent line an isosceles triangle having one angle of 72° and two angles each of 54°.

With reference to FIG. 3, the tubing layout is for a design in which tubes 10 have an outside diameter of 26 mm on a 40 mm transverse pitch, shown as the distance BG, BK, HF, HJ, and a diagonal pitch of 34 mm, shown as the distance FG, BF, BJ, JK. It can be seen that the transverse opening or ligaments TL, between, for example, tubes B and G are significantly larger than the diagonal ligaments or openings DL, for example, between G and F, B and F, B and J, and J and K. The ratio of ligament distances in this embodiment is i.e. 7:4 seen to be 14:8, which approximates to the 2:1 relationship offering the easiest flow passage.

With reference now for further explanation to the angles, the pentagon internal angle ABC is 108°, while angles ABD, CBD, FHB, JHB are each 54°. Similarly, angles HJB, BFH, BGF, FBG, JBK, JKB are also 54°, while angles HBJ, HBF, BFG, BJK are 72°. The resulting layout is therefore a series of isosceles triangles in which the larger 72° angles face the transverse openings and the smaller 54° angles face the diagonal openings.

Thus, for example, tube G on its parallel line T1 when taken with its two nearest or closest tubes L and F each on the same adjacent line T2 forms an isosceles triangle LFG having one angle LGF of 72° and two angles, GLF and GFL each of 54°.

The pentagonal layout of the tubing bundles according to the invention and having a reasonable ligament, offers a transverse opening greater in size than the diagonal openings. With a symmetrical bundle, the relationship between these openings for varying ratios of ligament to tube diameter is as shown in Table 1 below.

TABLE 1

| *Pitch | | | | |
|---|---|---|---|---|
| Diagonal | 1.1 | 1.2 | 1.3 | 1.4 |
| Transverse | 1.293 | 1.411 | 1.528 | 1.646 |
| *Ligament | | | | |
| Diagonal (DL) | 0.1 | 0.2 | 0.3 | 0.4 |
| Transverse (TL) | 0.293 | 0.411 | 0.528 | 0.646 |
| Ligament Ratio | | | | |
| Transverse Diagonal | 2.93 | 2.06 | 1.76 | 1.62 |

Pitch is distance of centre of tube to centre of adjacent tube.
*Numbers are expressed in terms of tube diameters.

The 2:1 ratio corresponds to the arrangement wherein the open space in the transverse opening equals the open space in the two associated diagonal openings and is the layout in which the maximum open space is provided in the tubing bundle. As a result, baffle spacings are decreased significantly in comparison with a tight hexagonal tubing layout. This provides the designer of the heat exchanger with more freedom. In systems where large volumes of shell-sided fluids have to be handled, this pentagonal tubular layout arrangement provides a maximum number of shell cross-flow paths to improve counter-current operations. At the same time, the volume occupied by the tube bundle is only moderately expanded. The ligament between the tubes is obviously tightest in the diagonal openings and clearly the smallest ligament consistent with fabrication, heat transfer and fluid pressure drop should be selected.

With the pentagonal layout of the invention, there is an open core which can be accessed through the tube sheet. Such access can be used for entry or exit of the shell side fluid, to allow the tube side fluid to be transferred from the bottom or top vestibule to the other, or for an internal bypass to provide control of heat transfer in the exchanger. In addition, where the pentagon has relatively sharp corners, these corners can be rounded by relocating tubes to the corners in the core in such a way that the bundle is more rounded and suited for insertion in a round shell. While the design examples cited here have been oriented to large volume streams such as are found in gas to gas heat exchangers found the sulphuric acid industry, the design approach will also be useful in any heat transfer problem where large flows are handled including liquid systems such as sulphuric acid coolers.

Set out below is a comparison between the gas flows associated with a modern large capacity duty as found in a 2,000 STPD sulphuric acid manufacturing plant. Table 2 compares a heat exchanger designed according to the radial design of U.S. Pat. No. 4,357,991, and a heat exchanger having the pentagonal tubular bundle layout design according to the invention. Each of the heat exchangers has the same number, length and size of tubing, and shell cross-flow passes. The table compares the tubing layout, shell size required and the pressure difference required to permit the necessary gas flows.

The heat exchangers are located between beds 2 and 3 and used to cool gas from 528° C. to a temperature 430° C. while heating gas from an intermediate absorber to a temperature of 204° C. to the higher temperature of 430° C. required for further reaction in a catalytic converter. Bed 2 exit gas passes through the tubes while the return gas is within the shell. Each heat exchanger had 1688 tubes of 5.08 cm O.D. of 7.2 m length and 14 gauge stainless steel wall. Each exchanger had approximately 1 cm minimum ligament while the velocity head of the gases in the core and annular baffle openings was set at 2.54 cm W.C. Each exchanger had four shell passes.

TABLE 2

| | Pentagonal tubular layout of invention | Radial tubular arrangement of U.S. Pat. No. 4357991 |
|---|---|---|
| U (overall) | 7.1 | 7.534 |
| Design Safety Factor | 1.25 | 1.337 |
| Pressure Loss (Shell) atm | 0.033 | 0.083 |
| Tube Rows | 14 | 18 (Two Tubing Densities) |
| Min. Ligament (cm) | 0.98 | 1.0 |
| Shell Diameter (m) | 7.35 | 7.40 |

As seen from the comparison in Table 2 above, with less than half the pressure drop the pentagonal tubular arrangement has 90% of the total heat transfer capacity. Clearly, the pentagonal tubular layout of the present invention provides significant advantages in terms of handling efficiently the large volumes of gas encountered in the industrial manufacture of sulphuric acid.

In designing a heat exchanger using the tubular layout of FIG. 2, the designer will typically begin by determining the heat load and temperature difference, estimate the heat transfer co-efficient and thus determine the area for heat transfer. The tube size length and numbers of tubes are then calculated and one fifth of the tubes allocated to each bundle.

The minimum diagonal or ligament distance DL is selected and the number of tubes per row and row per bundle selected. Dimension DL is largely chosen by determining the velocity of the fluid within the shell. If the tubing spacing is too tight the pressure loss becomes too great. Once distance DL is selected distance TL is set by the desired angular relationship.

There are two dimensions used in the pentagonal layout to describe the pitch. First is the diagonal pitch DP which is found by adding the minimum ligament dimension DL to the tube diameter. The second pitch is the transverse pitch which describes the center to center spacing of tubes in the line perpendicular to the gas flow across the bundle. This pitch is designated DT and is equal to the tube diameter and the transverse ligament. The relationship between the two pitch values for the regular pentagonal layout is $$DP = DL + D$$
$$TP = TL + D$$
$$\frac{TP}{2DP} = \cos 54°$$
$$\text{Pitch Ratio} = \frac{TP}{DP} = 2\cos 54°$$
$$\text{Ligament Ratio} = \frac{TL}{DL}$$

The relationship between the two ligaments is then found by subtracting the tube diameter from each pitch and the ligament ratio can be found. With a staggered tubing layout, there are two diagonal openings for each transverse opening and for an equal gas velocity through the two openings, the ligaments must be in a 2:1 ratio to each other. The earlier Table showing various ligament ratios for different diagonal pitch to tube diameter values shows that it is possible to generate such a ligament or close relationship to one with a ratio of diagonal pitch to tube diameter of 1.2 to 1.25, a concept that to-date has been missed in heat exchanger tubing layout.

The process for manufacturing sulphuric acid is well-known and, therefore, a typical process will be described briefly with reference to the use of a heat exchanger according to the present invention.

Figure 4:
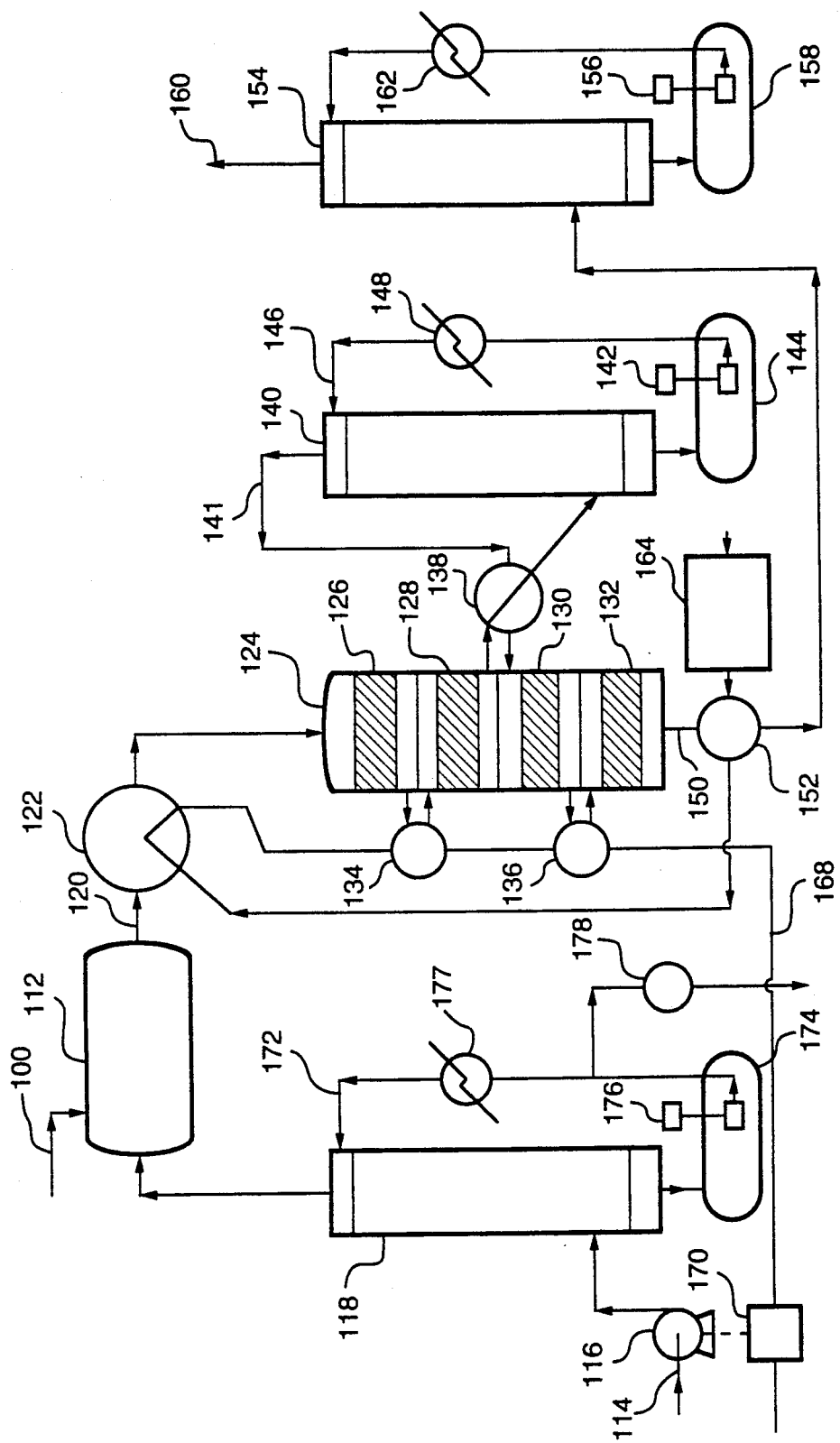
FIG. 4 is a flow sheet showing a sulphuric acid manufacturing plant comprising heat exchangers according to the invention.

As shown in FIG. 4 in the sulphuric acid plant 90 a sulphur stream 100 is pumped in liquid form to a furnace 112 into which it is sprayed. An air stream 114 is compressed by a blower 116, dried in drying tower 118, and then used to burn the sulphur in furnace 112. The resultant sulphur burner gas stream 120, which contains sulphur dioxide, has much of its heat removed in a waste heat boiler 122 for the generation of high quality high pressure steam. The sulphur dioxide gas stream 120 is then directed to a catalytic converter 124 having four catalyst beds 126, 128, 130, 132, wherein the sulphur dioxide is converted to sulphur trioxide. Cooling of the gas stream is required after each catalyst bed, since substantial amounts of heat are generated in the catalyst beds.

Heat exchangers 134, 136 are steam superheaters provided between beds 126 and 128 and between beds 130 and 132. In addition, when the gas leaves the second bed 128, it passes through heat exchanger 138 according to the invention where it is cooled and then passed to an intermediate absorption tower 140. In absorption tower 140, sulphur trioxide is absorbed in a countercurrent stream of sulphuric acid which is pumped by pump 142 from a pump tank 144 through duct 146 to the top of absorption tower 140. Acid from the bottom of absorption tower 140 is returned to pump tank 144. The circulating absorber acid is cooled by heat exchanger 148.

The gas stream 141 containing unconverted sulphur dioxide from the intermediate absorption tower 140 passes through heat exchanger 138 where it is partly reheated and then enters third bed 130 of converter 124. The gas from bed 130 passes to the fourth bed 132 and then leaves the converter as gas stream 150.

Gas stream 150 is cooled in an economizer 152 and then enters the final absorption tower 154. In tower 154 the sulphur trioxide is absorbed in sulphuric acid pumped by pump 156 from tank 158, the gas stream then being released at 160 to atmosphere. The circulating acid from tank 158 is cooled by cooler heat exchanger 162.

The high grade steam system is an important component of the plant. In this system, boiler feed water is treated at 164 to demineralize the water, is preheated in heat exchanger 152, and is then directed to boiler 122 to generate steam 166. Steam 166 is then directed through heat exchangers 134 and 136, which function as superheaters, to produce high pressure superheated steam 168, typically, at 600 pounds per square inch pressure (psig). The high pressure steam 168 is, typically, passed through a back pressure turbine 170, which drives blower 116 and which has a low exhaust steam pressure, typically, about 50 psig.

The heat from the absorption tower heat exchangers 148, 162 is low grade heat which is transferred to cooling water. The cooling water is then sent to cooling towers or other suitable location. In addition, drying in the drying tower 118 is effected by a stream of sulphuric acid 172 pumped from pumped tank 174 by pump 176. The drying acid is cooled by heat exchanger 177, utilizing cooling water which is then also directed to a cooling tower or heat sink. The acid in tank 174, which serves as product acid, is further cooled by heat exchanger 178, the standard connections between acid tanks 144, 158 and 174 are not shown.

It will be understood that the pentagonal tubing layout need not necessarily be centred coaxially of the axis of the shell.

In an alternative aspect, if shell nozzles are used, the pentagon could advantageously be shifted away from inlet and outlet nozzles to provide for gas transfer around the bundle and minimize the size of the shell.

Although this disclosure has described and illustrated a certain preferred embodiment of the invention, it is to be understood that the invention is not restricted to this particular embodiment. Rather, the invention includes all embodiments which are functional or mechanical equivalents of the specific embodiment and features that have been described and illustrated.

I claim:

1. A heat exchanger for exchanging heat between fluids comprising a shell and five tube bundles laid out as to collectively form a series of concentric pentagons, each pentagon having five corners wherein each adjacent pair of tube bundles define a corner angle of 108° and extend longitudinally within said shell and define a central space between them, said central space also extending longitudinally in said shell and being parallel to said tubes; each tube bundle consisting of a plurality of longitudinally extending parallel tubes in end view laid out in a set of parallel lines, said parallel lines intersecting at said corners to define five radial boundaries of said pentagons, wherein there is an array of tubes on and along each of said radial boundaries and wherein each tube on a first parallel line with the two nearest tubes each on a second line adjacent to said first line forms an isosceles triangle having one angle of 72° and two angles each of 54°.

2. A heat exchanger as claimed in claim 1 wherein said pentagons are regular-shaped.

3. A heat exchanger as claimed in claim 1 wherein the ratio of the diagonal ligament distance to the tube diameter is selected from the range 1:12 to 1:3; said diagonal ligament distance being the shortest distance between said each tube on said first parallel line and said nearest tube on said second line.

4. A heat exchanger as claimed in claim 1 further comprising a plurality of parallel tubes extending longitudinally within said shell between said tube bundles and said shell.

5. A plant for the manufacture of sulphuric acid by the oxidation of sulphur dioxide to sulphur trioxide in a catalytic converter and subsequent absorption of said sulphur trioxide in sulphuric acid, said plant comprising an absorption tower, a heat exchanger and said catalytic converter, the improvement comprising said heat exchanger as defined in claim 1.

* * * * *